(12) United States Patent
Schmid et al.

(10) Patent No.: US 11,415,089 B2
(45) Date of Patent: Aug. 16, 2022

(54) AIR FILTER WITH A PRIMARY AIR OUTLET AND A SECONDARY AIR OUTLET AS WELL AS FILTER ELEMENT THEREFOR

(71) Applicant: MANN+HUMMEL GmbH, Ludwigsburg (DE)

(72) Inventors: Daniel Schmid, Sachsenheim (DE); Matthias Krohlow, Herrenberg (DE); Martin Sonntag, Freiberg (DE); Steffen Pfannkuch, Ludwigsburg (DE); Martin Schmid, Reisbach (DE); Christoph Wittmers, Bietigheim-Bissingen (DE); Robert Hasenfratz, Schwaebisch Hall (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 97 days.

(21) Appl. No.: 17/165,137

(22) Filed: Feb. 2, 2021

(65) Prior Publication Data
US 2021/0246852 A1 Aug. 12, 2021

(30) Foreign Application Priority Data
Feb. 6, 2020 (DE) .......................... 102020103052.5

(51) Int. Cl.
*F02M 35/02* (2006.01)
*F02M 35/024* (2006.01)
(Continued)

(52) U.S. Cl.
CPC ... *F02M 35/02483* (2013.01); *B01D 46/2403* (2013.01); *F01N 3/303* (2013.01);
(Continued)

(58) Field of Classification Search
CPC ......... F02M 35/02483; F02M 35/0202; F02M 35/02433; F02M 35/0245; B01D 46/2403;
(Continued)

(56) References Cited

U.S. PATENT DOCUMENTS 3,672,130 A * 6/1972 Sullivan ............... F02M 35/022
 55/330
8,273,143 B2 * 9/2012 Coulonvaux ...... B01D 46/0005
 55/482

(Continued)

FOREIGN PATENT DOCUMENTS

DE 102014006117 A1 10/2015

*Primary Examiner* — Hung Q Nguyen

(57) ABSTRACT

A filter element has a filter medium folded in a star shape that surrounds annularly a longitudinal axis of the filter element and is flowed through radially from exterior to interior. The filter element has a primary air passage and a secondary air passage. In the filter medium, a cutout is formed that penetrates a plurality of folds of the filter medium. A passage socket at which the secondary air passage is formed extends through the cutout. An air filter provided with a filter housing having a raw air inlet, a primary air outlet, and a secondary air outlet, has such a filter element that separates in the filter housing a raw side communicating with the raw air inlet from a clean side. The (Continued)

primary air outlet communicates through the primary air passage and the secondary air outlet through the secondary air passage with the clean side, respectively.

21 Claims, 3 Drawing Sheets

(51) Int. Cl.
  *B01D 46/24* (2006.01)
  *F01N 3/30* (2006.01)
  *F01N 3/32* (2006.01)
(52) U.S. Cl.
  CPC ............ *F01N 3/32* (2013.01); *F02M 35/0202* (2013.01); *F02M 35/0245* (2013.01); *F02M 35/02433* (2013.01); *B01D 2279/60* (2013.01)

(58) Field of Classification Search
  CPC ............ B01D 2279/60; B01D 46/0047; B01D 46/2411; B01D 2265/06; Y02T 10/12
  See application file for complete search history.

(56) References Cited

U.S. PATENT DOCUMENTS

| | | | |
|---|---|---|---|
| 2001/0000845 A1* | 5/2001 | Coulonvaux | B01D 46/2414 |
| | | | 264/249 |
| 2005/0061292 A1 | 3/2005 | Prellwitz et al. | |
| 2014/0260136 A1 | 9/2014 | Kaiser | |
| 2016/0263512 A1* | 9/2016 | Pflueger | B01D 46/103 |
| 2017/0128867 A1* | 5/2017 | Vining | B01D 50/20 |
| 2018/0369732 A1 | 12/2018 | Karlsson et al. | |
| 2020/0171420 A1* | 6/2020 | Holm | B01D 46/0031 |

* cited by examiner

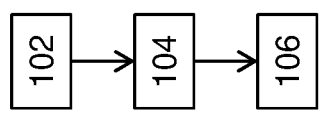
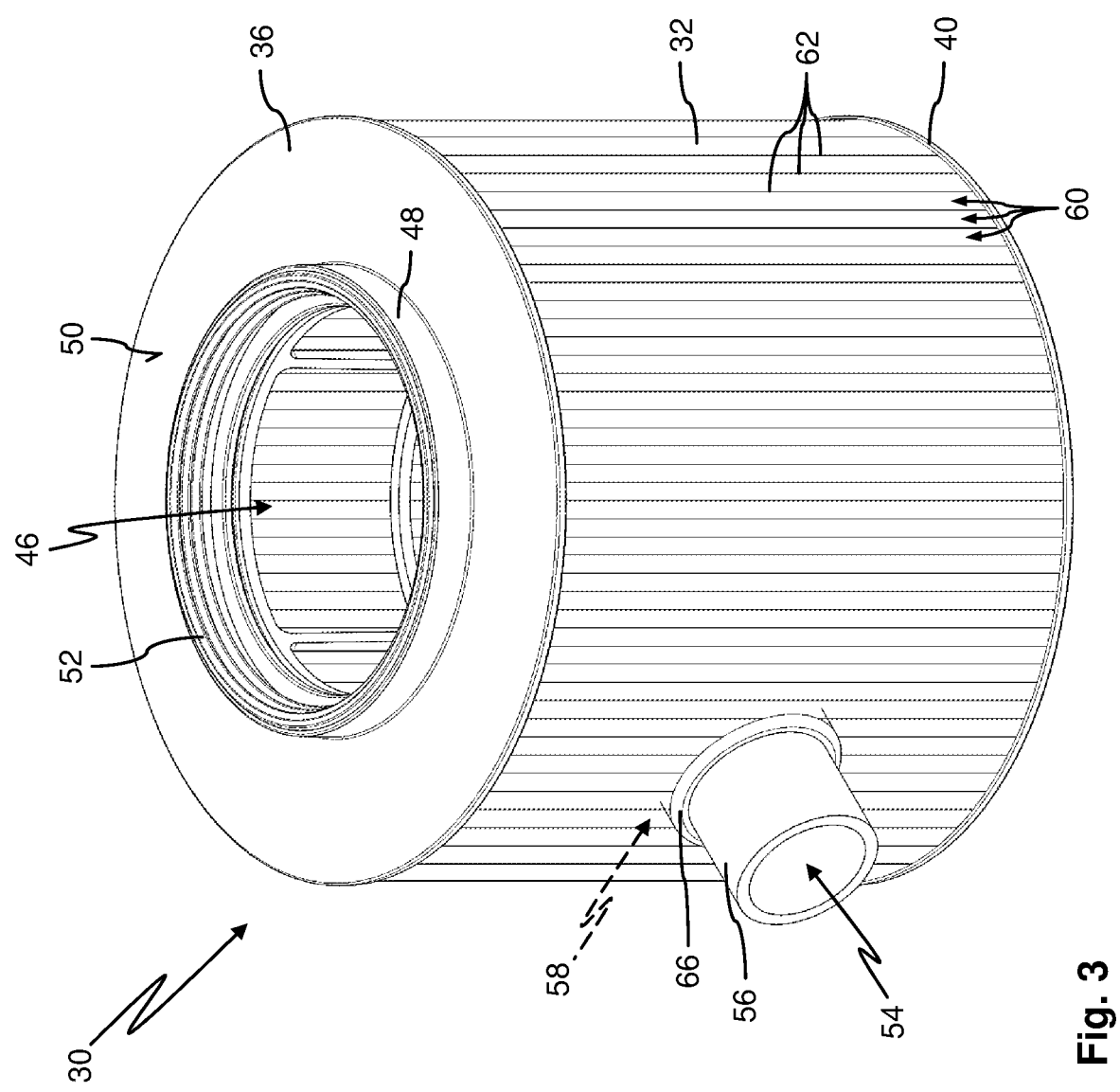

AIR FILTER WITH A PRIMARY AIR OUTLET AND A SECONDARY AIR OUTLET AS WELL AS FILTER ELEMENT THEREFOR

BACKGROUND OF THE INVENTION

The invention concerns an air filter with a raw air inlet, a primary air outlet, and a secondary air outlet.

Air filters with a primary air outlet and a secondary air outlet for filtered air are used, for example, in internal combustion engines of motor vehicles. The primary air outlet serves typically for providing (filtered) clean air for use in the combustion in the internal combustion engine. The secondary air outlet can serve, for example, for providing (filtered) clean air for use in an exhaust gas manifold of the internal combustion engine, for example, for exhaust gas aftertreatment.

EP 1 451 464 B1 describes an intake air filter for an internal combustion engine, with a filter housing that comprises a raw air inlet and a clean air outlet as well as a clean-side secondary air outlet. The intake air filter comprises an annular filter insert that is arranged in the filter housing and flowed through in radial direction from the exterior to the interior. The annular filter insert comprises at an axial end a first end disk that comprises at least one opening through which the clean air outlet communicates with an interior of the annular filter insert. The annular filter insert comprises at an axial end which is facing away from the first end disk a second end disk that comprises at least one opening through which the secondary air outlet communicates with the interior of the annular filter insert, wherein a connecting socket is formed at the second end disk.

A similar air filter is also disclosed in WO 2017/103 048 A1.

WO 2012/172017 A1 describes a filter element with an annular filter body which surrounds an interior in circumferential direction. In an end disk of the filter element a main connector is formed which is connected in fluid communication with the interior. The filter body comprises a channel which extends axially and which is open radially, wherein an auxiliary connector, which is connected in fluid communication with the interior, is arranged in the region of the channel.

DE 10 2014 006 117 B4 discloses a filter element embodied as a flat filter, wherein a filter medium body of the filter element is embodied curved and surrounds a flow space at least partially. The inwardly positioned flow space communicates by means of a flow socket with the exterior side at the filter element. The flow socket projects radially in relation to its length axis with one half into a cutout that is open at the rim into the filter medium body and projects partially past an end disk.

It is an object of the invention to provide an air filter with a primary air outlet and a secondary air outlet as well as a filter element therefor, in which a flow through the primary air outlet is not significantly affected by a flow through the secondary air outlet.

SUMMARY OF THE INVENTION

The object is solved by a filter element with a filter medium folded in a star shape that surrounds a longitudinal axis of the filter element in an annular shape, wherein the filter medium can be flowed through in radial direction from the exterior to the interior, wherein the filter element comprises a preferably central primary air passage and a secondary air passage, wherein in the folded filter medium a circumferentially closed cutout is formed that penetrates a plurality of folds of the filter medium, wherein an axial extension of the cutout is smaller than an axial extension of the filter medium folded in a star shape, and wherein a passage socket at which the secondary air passage is formed extends through the cutout.

The object is further solved by an air filter comprising:
 a filter housing with a raw air inlet, a primary air outlet, and a secondary air outlet,
 a filter element according to the invention that separates in the filter housing a raw side communicating with the raw air inlet from a clean side,
wherein the primary air outlet communicates through the primary air passage with the clean side and the secondary air outlet communicates through the secondary air passage with the clean side.

The invention moreover encompasses a method for mounting an air filter with a primary air outlet and a secondary air outlet that comprises the steps of:
 a) inserting the filter element into a housing element of the filter housing, in particular in axial direction,
 b) rotating the filter element about the longitudinal axis so that the passage socket and the outlet socket are seal-tightly connected to each other.

Preferred embodiments as well as variants are indicated in the respective dependent claims and the description.

Filter Element According to the Invention

According to the invention, a filter element is provided. The filter element comprises a filter medium. The filter medium surrounds a longitudinal axis of the filter element in an annular shape. For describing the present invention, the directional information, for example, radial, axial or eccentric—if nothing else is indicated—refers to the longitudinal axis of the filter element. The filter medium can be flowed through from the exterior to the interior in radial direction. Accordingly, a clean side of the filter element is formed radially inside the filter medium. The filter medium can be comprised of cellulose fibers, synthetic fibers, glass fibers or mixed media of the aforementioned fiber types.

The filter medium of the hollow cylindrical filter element according to the invention is folded in a star shape. In this way, an effective filter surface of the filter medium can be enlarged without increasing the outer dimensions of the filter element. Fold edges and folds of the filter medium extend typically in axial direction.

The filter element comprises a primary air passage and a secondary air passage. The primary air passage is preferably embodied centrally, in particular coaxially to the longitudinal axis, at the filter element. Filtered air (clean air) can flow out or be removed from the interior of the filter element, i.e., from the clean side, through the primary air passage and the at least one secondary air passage.

According to the invention, in the folded filter medium a circumferentially closed cutout is formed that interrupts a plurality of folds of the filter medium, in particular in axial direction. The interrupted folds extend to both sides of the cutout, typically to a first or second end disk. The cutout can be provided with a circular cross section. The cutout is in particular not provided at a rim of the filter medium that is folded in a star shape to a filter bellows, but preferably between its axial ends at both sides. The axial extension of the cutout is smaller in this context than an axial extension of the filter medium folded in a star shape whereby a cutout results that is strictly limited locally in axial direction.

Advantageously, the axial extension of the cutout is at least 4 times smaller, preferably 6 times smaller, than the axial extension of the filter medium folded in a star shape.

According to the invention, it is furthermore provided that a passage socket at which the secondary air passage is formed extends through the cutout. The cutout makes it possible to pass the passage socket through the filter medium. In this way, by means of the secondary air passage that is formed at the passage socket, a fluid flow connection from the radially inwardly positioned clean side to a secondary air outlet of a filter housing for the filter element can be provided. The secondary air passage can be embodied as a channel that extends through the passage socket. The passage socket is in principle arranged eccentrically at the filter element. In other words, a radially outer section, in particular a free end, of the passage socket in any case is not positioned on the longitudinal axis of the filter element.

The passage socket with the secondary air passage enables branching off a secondary air flow, spatially separate from the primary air passage, from the clean side of the filter element. In this way, an influence on the flow through the primary air passage by the flow through the secondary air passage can be at least reduced or preferably prevented. In particular, by means of the separate clean air passages it can be achieved that a velocity profile of the air flow in a primary air outlet of a filter housing is qualitatively not affected, or at least not significantly, by the filter element in regard to whether air is flowing or not flowing through the secondary air passage and a correlated secondary air outlet of the filter housing, respectively, in regard to how large a volume flow or mass flow of clean air through the secondary air passage is.

Advantageously, a fold course of the fold of the filter medium folded in a star shape axially bordering the cutout continues. In this way, the introduction of the cutout achieves a loss of filter surface as small as possible—in contrast to the prior art where the cutout extends across the entire axial length of the filter bellows. Advantageously, the fold course of the folds of the filter medium folded in a star shape continues at both sides axially bordering the cutout.

Preferably, end edges of the (interrupted) folds of the filter medium bordering the cutout are glued or bonded to each other along a circumference. In this way, leakage of raw air to the clean side of the filter element in the region of the cutout can be avoided. For gluing (bonding) the end edges, a hot melt can be used. The glued connection of the end edges typically surrounds the cutout continuously in circumferential direction of the cutout.

A seal can be arranged between the passage socket and the filter medium radially inwardly and/or radially outwardly at the filter medium. The seal prevents leakage between the radially inwardly positioned clean side and a radially outwardly positioned raw side of the filter element at the passage socket. The seal surrounds the passage socket typically in an annular shape. The seal can be comprised of polyurethane.

The passage socket can be bonded circumferentially to the filter medium radially inwardly and/or radially outwardly at the filter medium. The bonded connection acts like a seal or forms a seal and prevents leakage bypassing the passage socket.

The passage socket can end radially outwardly flush with the filter medium. Preferably, it is however provided that the passage socket in radial direction projects past the filter medium. This can simplify the connection of the passage socket with a secondary air outlet of a filter housing.

At the free end of the passage socket, a sealing element can be secured. Upon exchange of the filter element, the sealing element is thus also exchanged. In this way, it can be achieved that the connection of the passage socket with the secondary air outlet of the filter housing provides the required seal-tightness properties after exchange of the filter element. The sealing element can be comprised of an elastomer or polyurethane foam. Preferably, the sealing element is injection molded to the passage socket. In case of a passage socket that ends flush, the sealing element can be formed as one piece together with a seal between the passage socket and the filter medium. In particular, in case of a passage socket that ends flush, an externally circumferentially extending bonded connection of the passage socket with the filter element can form the sealing element.

Advantageously, the passage socket is formed at a support tube that is arranged radially inside the filter medium. The support tube can stabilize the filter medium. In particular, the support tube can prevent a collapse of the filter medium radially inwardly and an axial compression of the filter medium. The support tube can comprise axially extending webs and circumferentially extending webs. Due to the joint provision of the support tube and of the passage socket, the manufacture of the filter element can be simplified. For assembly, the filter element can first be pushed with the cutout across the passage socket and can then be placed against the circumference of the support tube. Subsequently, end folds of the filter medium can be connected to each other so that an annularly closed filter medium is obtained.

Preferably, the passage socket and the support tube are formed together as one piece. This can simplify manufacture and handling of the support tube and of the passage socket.

The passage socket can be curved or comprise a curved section, in particular at its free end. Preferably, it is however provided that the passage socket extends straight. This can simplify mounting of the filter medium and passage socket on each other. Moreover, this may be advantageous for flow through the filter element, in particular through the secondary air passage.

The passage socket can extend at a slant and/or askew to the longitudinal axis. Preferably, it is however provided that the passage socket extends radially in relation to the longitudinal axis. This can be advantageous for mounting the filter element in a filter housing, in particular with respect to positional tolerances of elements at the filter element or filter housing.

The passage socket can comprise a flange for contacting the filter medium. The flange can rest radially inwardly or radially outwardly against the filter medium. The flange can contribute to preventing leakage bypassing the passage socket. Moreover, the flange can simplify mounting of filter medium and passage socket on each other.

The filter element can comprise a first and a second end disk arranged at oppositely positioned end faces of the filter medium. The end disks can stabilize the filter element. The end disks are preferably connected seal-tightly, typically material-fused, to the filter medium. The filter medium can be welded to the end disks (preferably by thermally plastifying the end disks, in particular by means of infrared radiation), glued thereto or connected by foaming with the end disks. The end disk can each have an annular circumferentially extending front section which extends preferably in a plane that is perpendicular relative to the longitudinal axis. The end disks can be comprised of plastic material or polyurethane foam.

The primary air passage can be embodied as a penetration in the first end disk. The first end disk with the penetration can be connected to a primary air outlet of a filter housing. The second end disk is preferably of a closed configuration. The second end disk effects in this way a separation of a raw side from the clean side within the filter element.

At the first end disk, an additional sealing element can be secured that annularly surrounds the primary air passage. The additional sealing element can simplify the connection of the primary air passage to the primary air outlet of the filter housing. Preferably, the additional sealing element is injection molded to the first end disk. The additional sealing element can be comprised of an elastomer or of polyurethane foam.

Preferably, the primary air passage is annularly surrounded by a projection of the first end disk. The projection can center the filter element in relation to the primary air outlet at the filter housing. The projection can in particular project past a flat front section of the first end disk (project away from the front section). The additional sealing element can be secured at the projection or can be injection molded to the projection.

The cutout in the filter element can be produced by drilling through the filter medium that is folded in a star shape. For drilling through the folded filter medium, a drill bit can be employed. Alternatively, ultrasonic waves can be used.

Alternatively, the cutout in the filter element can be produced by cutting the unfolded filter medium, in particular by means of laser radiation, of a waterjet, of a knife, preferably a rolling knife, or of ultrasonic waves. Subsequent to the cutting action, the filter medium is folded in a star shape.

Air Filter According to the Invention

An air filter is moreover encompassed by the present invention. The air filter comprises a filter housing with a raw air inlet, a primary air outlet, and a secondary air outlet. Furthermore, the air filter comprises a filter element according to the invention as described above that separates a raw side communicating with the raw air inlet from a clean side in the filter housing. The raw side and the clean side can also be referred to as a raw space and a clean space, respectively. In operation of the air filter, raw air to be filtered flows through the raw air inlet into the raw side of the housing. From the raw side, the air passes through the filter medium to the clean side wherein dirt particles can be separated from the air and retained in the filter medium.

According to the invention, the primary air outlet communicates through the primary air passage with the clean side and the secondary air outlet through the secondary air passage. In other words, the primary air outlet is connected in fluid communication to the clean side through the primary air passage. The secondary air outlet is connected in fluid communication to the clean side through the secondary air passage. In operation of the air filter, filtered clean air can be removed from the air filter, or flow out of the air filter, from the clean side through the primary air outlet and the secondary air outlet. In this context, a volume flow or mass flow of clean air flowing through the primary air outlet is typically significantly larger than a volume flow or mass flow of clean air flowing through the secondary air outlet. Due to the constructive separation of the secondary air passage from the primary air passage at the filter element in accordance with the invention, an influence on the flow through the primary air outlet by the flow through the secondary air outlet can be avoided or at least substantially reduced.

The air filter can be part of an internal combustion engine, in particular of a motor vehicle. Through the primary air outlet, the internal combustion engine can be supplied with filtered combustion air, in particular wherein an air mass sensor is arranged downstream of the primary air outlet. Via the secondary air outlet, for example, an exhaust gas aftertreatment device can be connected to the air filter and, as needed, supplied with filtered clean air.

The passage socket can be connected seal-tightly to an outlet socket of the filter housing. At the outlet socket, the secondary air outlet is formed. In particular, the outlet socket can surround the secondary air outlet in an annular shape. The outlet socket typically projects past a housing wall of the filter housing inwardly. In other words, the outlet socket typically projects from the housing wall into a housing interior of the filter housing. A sealing element can be arranged between the outlet socket and the passage socket. On the one hand, the outlet socket at the filter housing can simplify mounting of the filter element in the filter housing. On the other hand, the outlet socket can simplify connecting a device to be supplied with secondary air to the air filter. For this purpose, the outlet socket can project outwardly past the housing wall. In special cases, the outlet socket can end inwardly and/or outwardly flush with the housing wall.

Mounting Method According to the Invention

The present invention furthermore encompasses a method for mounting an air filter according to the invention in which the passage socket is connected seal-tightly to an outlet socket of the filter housing. The method comprises the steps:

a) inserting the filter element into a housing element of the filter housing, b) rotating the filter element about the longitudinal axis so that the passage socket and the outlet socket are connected seal-tightly to each other.

Prior to performing the step a), the housing element and an additional housing element can be separated from each other, as needed. In this way, an access for inserting the filter element into the housing pot is provided. The housing element can be a housing pot or a housing cover. The additional housing element can be correspondingly a housing cover or a housing pot.

In step a), the filter element is arranged at the housing element. At the housing element, in principle the primary air outlet and the secondary air outlet are formed. Preferably, the filter element is inserted in axial direction into the housing element. In this context, typically the primary air passage of the filter element is connected to the primary air outlet of the housing element. The passage socket and the outlet socket are arranged in this context in principle displaced relative to each other in circumferential direction. The axial position of the filter element in the filter housing to be adjusted in step a) can be defined by an axial stop.

In step b), the passage socket is connected seal-tightly with the outlet socket. In this way, a fluid flow connection of the secondary air outlet with the clean side of the filter element is provided through the secondary air passage at the passage socket. This connection is obtained in a simple way by rotation of the filter element.

Preferably, the rotational end position to be adjusted in step b) is defined by a rotational stop between the filter housing and the filter element. The rotational stop is typically formed at the housing element. The rotational stop can keep the filter element in the rotational end position. In this way, it can be achieved that the seal-tight connection of the passage socket with the outlet socket is not accidentally released in operation of the air filter. In particular, the filter element can be locked at the filter pot.

By means of the method according to the invention, mounting of the filter element is divided into two simple partial movements. At the same time, the seal-tight connection provided thereby of the outlet socket with the passage socket prevents that the clean side and the raw side accidentally can communicate with each other through the secondary air passage. Accordingly, on the one hand, leakage of clean air from the clean side to the raw side and, on the other hand, flow of unfiltered raw air from the raw side to the clean side is avoided.

Typically, in the step c) the housing element and the additional housing element are connected to each other. In this way, the filter housing is closed relative to the exterior.

BRIEF DESCRIPTION OF THE DRAWINGS

Further features and advantages of the invention result from the following detailed description of embodiments of the invention, from the claims as well as from the Figures of the drawing showing details according to the invention. The aforementioned and still further explained features can be realized each individually or several combined in any expedient combinations in variants of the invention. The features illustrated in the drawing are illustrated such that the particularities according to the invention can be made clearly visible.

FIG. 3 shows the filter element of the air filter of FIG. 1 in a schematic perspective view.

FIG. 4 shows a schematic flowchart of a mounting method according to the invention.

DESCRIPTION OF PREFERRED EMBODIMENTS

Figure 1:
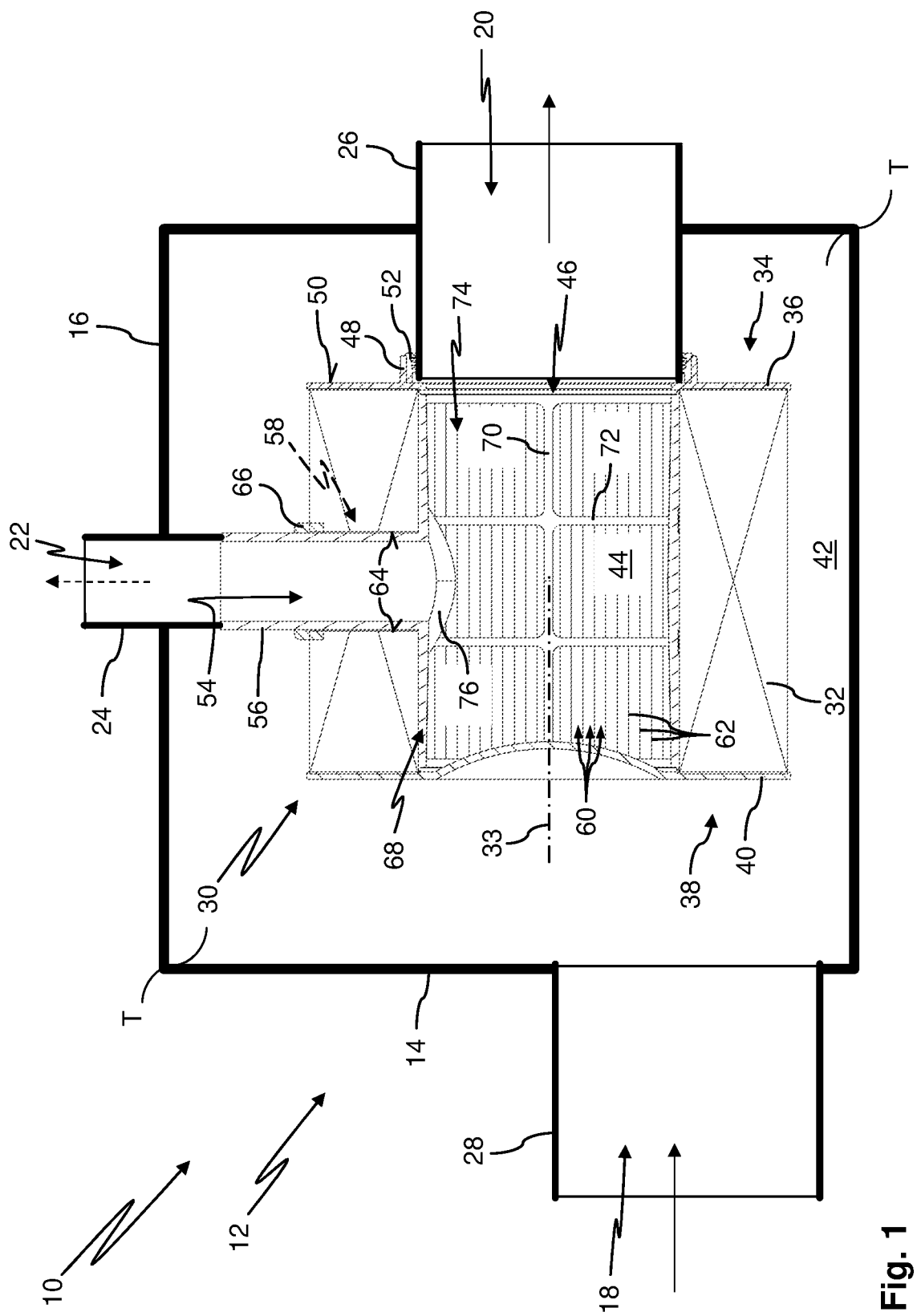
FIG. 1 shows in a schematic section view an air filter according to the invention with a filter housing at which a primary air outlet and a secondary air outlet are formed, and with a filter element according to the invention with a primary air passage and a secondary air passage that is arranged in the filter housing and that comprises a filter medium folded in a star shape, in which a cutout penetrates a plurality of folds, wherein a passage socket at which the secondary air passage is formed passes through the cutout.

FIG. 1 shows an air filter 10. The air filter 10 comprises a filter housing 12. The filter housing 12 can comprise a housing pot 14 and a housing cover 16. The filter housing 12 is illustrated in a greatly abstracted form in FIG. 1. The housing pot 14 and the housing cover 16 are connected seal-tightly to each other for operation of the air filter 10. The filter housing 12 comprises a raw air inlet 18, a primary air outlet 20, and a secondary air outlet 22. The primary air outlet 20 and the secondary air outlet 22 are embodied here at the housing pot 14. The raw air inlet 18 is formed herein at the housing cover 16. The filter housing 12 can be divided diagonally as is schematically indicated by wavy lines. The flow through the filter housing 12 is indicated by arrows.

The secondary air outlet 22 can be formed at an outlet socket 24. The outlet socket 24 projects in the illustrated embodiment of the air filter 10, on the one hand, outwardly away from the filter housing 12 and, on the other hand, inwardly into the filter housing 12.

The primary air outlet 20 can be formed at an additional outlet socket 26. The additional outlet socket 26 projects in the illustrated embodiment of the air filter 10, on the one hand, outwardly away from the filter housing 12 and, on the other hand, inwardly into the filter housing 12.

The raw air inlet 18 can be formed at an inlet socket 28. The inlet socket 28 projects in the illustrated embodiment of the air filter 10 outwardly away from the filter housing 12.

Figure 2:
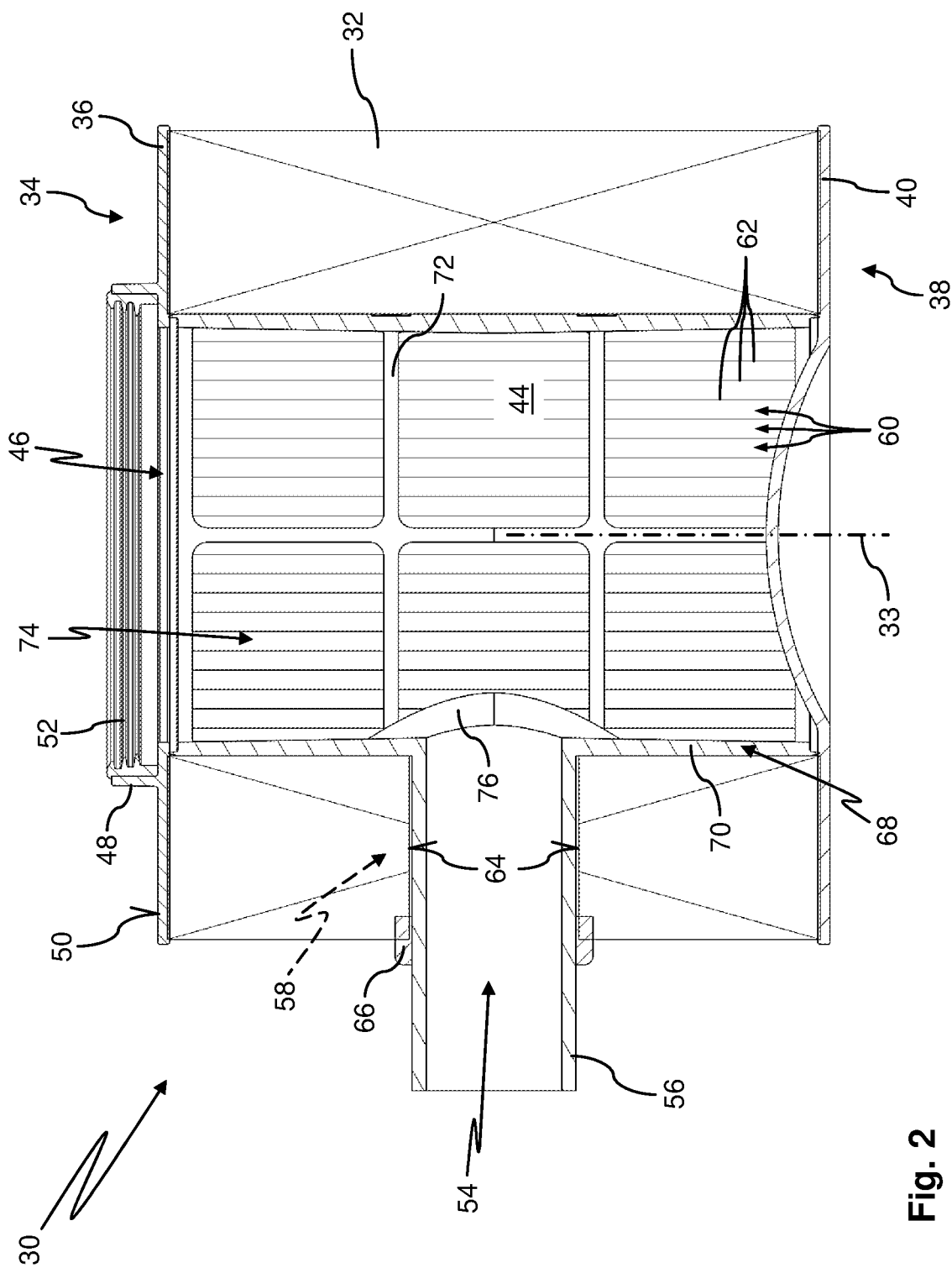
FIG. 2 shows the filter element of the air filter of FIG. 1 in an enlarged schematic section view.

The air filter 10 comprises moreover a filter element 30. The filter element 30 is illustrated in FIG. 2 in an enlarged section view relative to FIG. 1. FIG. 3 shows the filter element 30 in a perspective view.

The filter element 30 comprises a filter medium 32. The filter medium 32 surrounds a longitudinal axis 33 of the filter element 30 in an annular shape. The filter element 30 can be flowed through in radial direction from the exterior to the interior. The filter medium 32 is folded in a star shape. At a first end face 34, the filter element 30 comprises a first end disk 36. At a second end face 38, the filter element 30 comprises a second end disk 40. The first and the second end faces 34, 38 are positioned at axially oppositely positioned ends of the filter element 30. The first and the second end disks 36, 40 each are air-tightly connected, for example, welded, to the filter medium 32.

Inside of the filter housing 12, the filter element 30 separates a raw side 42 from a clean side 44. The raw side 42 is the space outside of the filter element 14. The clean side 44 is the space inside of the filter medium 32 and between the end disks 36, 40. The second end disk 40 is of a closed embodiment for separating the raw side 42 from the clean side 44. The raw side 42 can also be referred to as a raw space and the clean side 44 as a clean space. In operation of the air filter 10, the raw air to be filtered flows through the raw air inlet 18 to the raw side 42. From the raw side 42, the air flows through the filter medium 32 and passes as filtered clean air to the clean side 44.

The first end disk 36 comprises a primary air passage 46. The primary air passage 46 is formed by a penetration in the first end disk 36. Through the primary air passage 46, the clean side 44 communicates with the primary air outlet 20. The primary air passage 46 can be surrounded by an annular projection 48. The projection 48 projects in axial direction past the front section 50 of the first end disk 36. The front section 50 extends here in a plane that is perpendicular to the longitudinal axis 33. A sealing element 52 can be secured at the projection 48, in particular can be injection molded to the projection 48. The sealing element 52 seals the primary air outlet 20, here the additional outlet socket 26, relative to the first end disk 36. The primary air passage 46 and the projection 48 can be arranged coaxially to the longitudinal axis 33.

The filter element 30 comprises a secondary air passage 54. The secondary air passage 54 is formed at a passage socket 56. The passage socket 56 surrounds a channel which forms the secondary air passage 54. The passage socket 56 projects through the filter medium 32. In the illustrated embodiment of the filter element 30, the passage socket 56 extends straight and radially relative to the longitudinal axis 33. The passage socket 56 with the secondary air outlet 54 can be arranged, viewed in axial direction, centrally at the filter element 30.

The filter medium 32 comprises a cutout 58 through which the passage socket 56 is extending. The cutout 58 penetrates the filter medium 32 in the region of a plurality of its folds 60, compare in particular FIG. 3. In FIG. 3, radially outer fold edges 62 of the folds 60 can be seen; in FIGS. 1 and 2, radially inner fold edges 62 of the folds 60 can be seen. The folds 60 or fold edges 62 can extend parallel to the longitudinal axis 33. In the region of the cutout 58, partial sections of the folds 60 extend from the first or the second end disk 36, 42 all the way to the cutout 58, respectively. In the remaining circumferential region of the filter element 30, the folds 60 extend continuously from the first end disk 36 to the second end disk 40.

For sealing the raw side 42 relative to the clean side 44 in the region of the cutout 58, end edges 64 of the folds 60 (interrupted by the cutout 58) bordering the cutout 58 are glued to each other, compare in particular FIG. 2. Radially outside at the filter medium 32, a seal 66 is arranged which surrounds the passage socket 56 in an annular shape. The seal 66 seals the passage socket 56 on the outer side relative to the filter medium 32. The seal 66 can be embodied as a bonded connection of the through passage 56 with the filter medium 32.

The filter element 30 comprises here a support tube 68. The support tube 68 is arranged radially inwardly at the filter medium 32. The support tube 68 extends from the first end disk 36 to the second end disk 40. The support tube 68 can comprise axially extending webs 70 and webs 72 extending in circumferential direction. Between the webs 70, 72, windows 74 that can be flowed through are formed.

The passage socket 56 can be embodied as one piece together with the support tube 68. The passage socket 56 can comprise at its radial inner end a flange 76 for contacting the filter medium 32. Herein, the flange 76 surrounds the cutout 58 at the clean side.

Radially outwardly, the passage socket 56 can project past the filter medium 32. In other words, the passage socket 56 projects past the filter medium 32. At the projecting free end of the passage socket 56, a sealing element, not illustrated in detail in FIGS. 1 to 3, can be secured. When the filter element 30 is installed in the filter housing 12, the sealing element is arranged between the passage socket 56 and the outlet socket 24.

FIG. 4 shows a flowchart of a mounting method for an air filter. The method will be described in the following based on the example of the above-described air filter 10, see also FIGS. 1 to 3.

In a first step 102, the filter element 30 is inserted into the housing pot 14 of the filter housing 12. The housing cover 16 is removed for this purpose from the housing pot 14. Insertion of the filter element 30 is realized typically in a substantially straight movement along the longitudinal axis 33. Upon insertion, the passage socket 56 of the filter element 30 basically does not point to the secondary air outlet 22 or to the outlet socket 24. In this context, the first end disk 36 is pushed onto the additional outlet socket 26, wherein an airtight connection between the additional outlet socket 26 and the first end disk 36 about the primary air passage 46 can be obtained.

In a subsequent step 104, the filter element 30 is rotated relative to the housing cover 16 about the longitudinal axis 33 until the passage socket 56 and the secondary air outlet 22 or outlet socket 24 are aligned so as to correspond with each other. In this way, a seal-tight connection between the passage socket 56 and the outlet socket 24 is realized. In particular, in this context a sealing element (not illustrated in detail in FIG. 1) can be arranged between the passage socket 56 and the outlet socket 24. The radial position of the filter element 30 in the housing pot 14 can be determined by the projection 48, which surrounds the primary air passage 46, being guided at the additional outlet socket 26. Preferably, the rotational end position of the filter element 30 adjusted in step 104 in which the passage socket 56 is corresponding with the outlet socket 24 is secured by locking of a holding element (not illustrated in detail in FIGS. 1 to 3) of the filter element 30 at the housing cover 16.

Subsequently, the housing cover 16 is placed onto the housing pot 14 in step 106. The housing cover 16 can secure the axial position of the filter element 30 relative to the housing pot 14, for example, by means of an axial stop, not illustrated in detail, which interacts with the second end disk 40.

What is claimed is:

1. A hollow cylindrical filter element comprising:
    a filter medium folded in a star shape and surrounding a longitudinal axis of the filter element in an annular shape, wherein the filter medium is configured to be flowed through in a radial direction relative to the longitudinal axis from an exterior to an interior of the filter medium;
    wherein the filter medium comprises a circumferentially closed cutout penetrating a plurality of folds of the filter medium, wherein an axial extension of the cutout along the longitudinal axis is smaller than an axial extension of the filter medium along the longitudinal axis;
    a primary air passage and a secondary air passage;
    a passage socket extending through the cutout, wherein the secondary air passage is formed at the passage socket.

2. The filter element according to claim 1, wherein a fold course of the folds of the filter medium penetrated by the cutout continues axially bordering the cutout.

3. The filter element according to claim 1, wherein end edges of the folds of the filter medium penetrated by the cutout that are bordering the cutout are glued or bonded to each other along a circumference of the cutout.

4. The filter element according to claim 1, further comprising a seal arranged between the passage socket and the filter medium, wherein the seal is arranged radially inwardly and/or radially outwardly at the filter medium.

5. The filter element according to claim 1, wherein the passage socket is bonded about a circumference thereof radially inwardly and/or radially outwardly to the filter medium.

6. The filter element according to claim 1, wherein the passage socket is projecting in a radial direction past the filter medium.

7. The filter element according to claim 6, further comprising a sealing element secured at a free end of the passage socket.

8. The filter element according to claim 1, further comprising a support tube arranged radially inwardly at the filter medium, wherein the passage socket is provided at the support tube.

9. The filter element according to claim 8, wherein the passage socket and the support tube are formed together as one piece.

10. The filter element according to claim 1, wherein the passage socket extends straight.

11. The filter element according to claim 10, wherein the passage socket extends radially relative to the longitudinal axis.

12. The filter element according to claim 1, wherein the passage socket comprises a flange configured to contact the filter medium.

13. The filter element according to claim 1, furthermore comprising a first end disk and a second end disk arranged at oppositely positioned end faces of the filter medium, respectively.

14. The filter element according to claim 13, wherein the primary air passage is a penetration formed in the first end disk.

15. The filter element according to claim 14, wherein the second end disk is closed.

16. The filter element according to claim 13, further comprising a sealing element arranged at the first end disk, wherein the sealing element is annular and surrounds the primary air passage.

17. The filter element according to claim 16, wherein the sealing element
is injection molded to the first end disk.

18. An air filter comprising:
- a filter housing comprising a raw air inlet, a primary air outlet, and a secondary air outlet;
- a hollow cylindrical filter element separating in the filter housing a raw side, communicating with the raw air inlet, from a clean side, wherein the hollow cylindrical filter element comprises:
- a filter medium folded in a star shape and surrounding a longitudinal axis of the filter element in an annular shape, wherein the filter medium is configured to be flowed through in a radial direction relative to the longitudinal axis from an exterior to an interior of the filter medium, wherein the filter medium comprises a circumferentially closed cutout penetrating a plurality of folds of the filter medium, wherein an axial extension of the cutout along the longitudinal axis is smaller than an axial extension of the filter medium along the longitudinal axis;
- a primary air passage and a secondary air passage;
- a passage socket extending through the cutout, wherein the secondary air passage is formed at the passage socket;
- wherein the primary air outlet communicates through the primary air passage with the clean side and wherein the secondary air outlet communicates through the secondary air passage with the clean side.

19. The air filter according to claim 18, wherein the passage socket is connected seal-tightly to an outlet socket of the filter housing.

20. A method for mounting the air filter according to claim 19, the method comprising:
a) inserting the filter element into a housing element of the filter housing; and
b) rotating the filter element about the longitudinal axis of the filter element so that the passage socket and the outlet socket of the filter housing are seal-tightly connected to each other.

21. The method according to claim 20, wherein the filter element is axially inserted into the housing element in an axial direction along the longitudinal axis of the filter element.

* * * * *